United States Patent [19]

Nishida et al.

[11] Patent Number: 4,674,347

[45] Date of Patent: Jun. 23, 1987

[54] TORSIONAL VIBRATION ABSORBING SYSTEM FOR VEHICULAR POWER TRANSMISSION

[75] Inventors: Hisato Nishida; Tadami Kondo, both of Tokyo, Japan

[73] Assignee: Honda Giken Kogyo Kabushiki Kaisha, Tokyo, Japan

[21] Appl. No.: 823,965

[22] Filed: Jan. 29, 1986

Related U.S. Application Data

[63] Continuation of Ser. No. 531,432, Sep. 12, 1983, abandoned.

[30] Foreign Application Priority Data

Feb. 15, 1983 [JP] Japan .................................. 58-23272
Feb. 15, 1983 [JP] Japan .................................. 58-23273

[51] Int. Cl.$^4$ .............................................. F16H 3/08
[52] U.S. Cl. ................................ 74/359; 74/412 TA; 192/55; 192/93 A
[58] Field of Search ............... 74/359, 412 TA, 333, 74/337; 192/70.23, 54.55, 93 A; 464/37, 38, 45, 46

[56] References Cited

U.S. PATENT DOCUMENTS

| | | | |
|---|---|---|---|
| 2,351,996 | 6/1944 | Morgan | 192/70.23 X |
| 2,725,758 | 12/1955 | Dickey | 464/38 X |
| 2,799,375 | 7/1957 | Forster | 74/337 X |
| 3,064,455 | 11/1962 | Gros | 464/46 X |
| 3,557,574 | 1/1971 | Avery | 464/38 X |
| 3,578,119 | 5/1971 | Auriol | 192/70.23 X |
| 4,062,203 | 12/1977 | Leonard et al. | 464/38 X |

FOREIGN PATENT DOCUMENTS

| | | | |
|---|---|---|---|
| 664336 | 8/1938 | Fed. Rep. of Germany . | |
| 1321139 | 12/1963 | France | 74/359 |
| 56-76729 | 6/1981 | Japan | 192/54 |
| 57-97938 | 6/1982 | Japan | 464/38 |
| 464670 | 4/1937 | United Kingdom . | |
| 1282377 | 7/1972 | United Kingdom . | |
| 2089000 | 6/1982 | United Kingdom . | |

*Primary Examiner*—Leslie Braun
*Assistant Examiner*—Joseph M. Rolnicki
*Attorney, Agent, or Firm*—Lyon & Lyon

[57] ABSTRACT

A torsional vibration absorbing device for a transmission, such as manual shift automotive transmission, wherein a friction clutch is provided on the output shaft within the transmission. One set of springs apply a constant resilient force to the friction clutch. Interengaging cam plates are caused to separate axially by increases in torque transmitted and another set of springs impose an additional resilient force on the friction clutch to reduce slippage upon such separation. The cams on the cam plates have helically shaped surfaces for full face-to-face contact and the slopes of the surfaces are different for forward or reverse drive therethrough to provide different slippage characteristics for acceleration and deceleration.

11 Claims, 3 Drawing Figures

TORSIONAL VIBRATION ABSORBING SYSTEM FOR VEHICULAR POWER TRANSMISSION

This application is a continuation of application Ser. No. 531,432, filed Sept. 12, 1983 now abandoned.

The present invention relates to a torsional vibration absorbing system for use in the power transmission of a vehicle such as an automobile.

In any positive drive transmission subject to irregular and rapidly varying loads, such as a manual automobile transmission during acceleration and deceleration and changes therein, there are torsional vibrations and shocks developed that are undesirable from both an operational and a comfort standpoint. Frictional clutches have been employed in attempts to absorb such vibrations and shocks automatically but normally there is an undesirable lost of the torque transmitting capability as well which is undesirable from a performance standpoint.

The assignee of this application has already proposed in a prior application (Ser. No. 326,746, filed Dec. 2, 1981, entitled Torsional Vibration Absorber Device) a torsional vibration absorbing system of the type in which a first shaft leading to a drive side and a second shaft leading to a driven side are relatively rotatable and connected through a frictional clutch or transmission having a predetermined frictional force such that they slip when they receive a transmission torque equal to or higher than a predetermined value, in which first and second cam plates adapted to rotate relative to each other when they receive said torque are disposed in the power train of the friction transmission, and in which the cam plates have their opposite faces formed with cams made coactive with each other in response to the relative rotations thereof for moving the two cam plates apart from each other in a manner to increase the frictional force of the friction clutch or transmission. According to that construction, since the torsional vibrations resulting from the variations in the torque of the power transmitted can be absorbed by the slippage of the friction clutch and by the relative rotation of the first and second cam plates, there is provided a torsional vibration absorbing system which has a large vibration absorbing capacity in spite of its small size.

According to the aforementioned prior proposal, however, since the cam slopes made operative upon application of the positive and negative loads are formed to have an equal angle of inclination, it is difficult to attain such torsional vibration absorbing characteristics as can satisfy both running conditions, i.e., the acceleration and decleration of an engine, in which the degrees of the torque fluctuations are different. Moreover, due to the shapes of the previously proposed cam surfaces and the loads involved, substantial wearing of the cam surfaces was encountered.

It is, therefore, an object of the present invention to provide an improvement in the aforementioned system, in which the torsional vibration absorbing characteristics are made different for acceleration and deceleration by making different angles of inclination on the cams so that the torsional vibration absorbing requirements can be satisfied in the two running states.

Another object of this invention is to provide such a system with improved durability by reason of cam face shapes that ensure face-to-face contact throughout the range of movement. Specifically, an object of this invention is to provide helically shaped cam surfaces.

The present invention will be described in connection with a preferred embodiment thereof with reference to the accompanying drawings.

Figure 1:
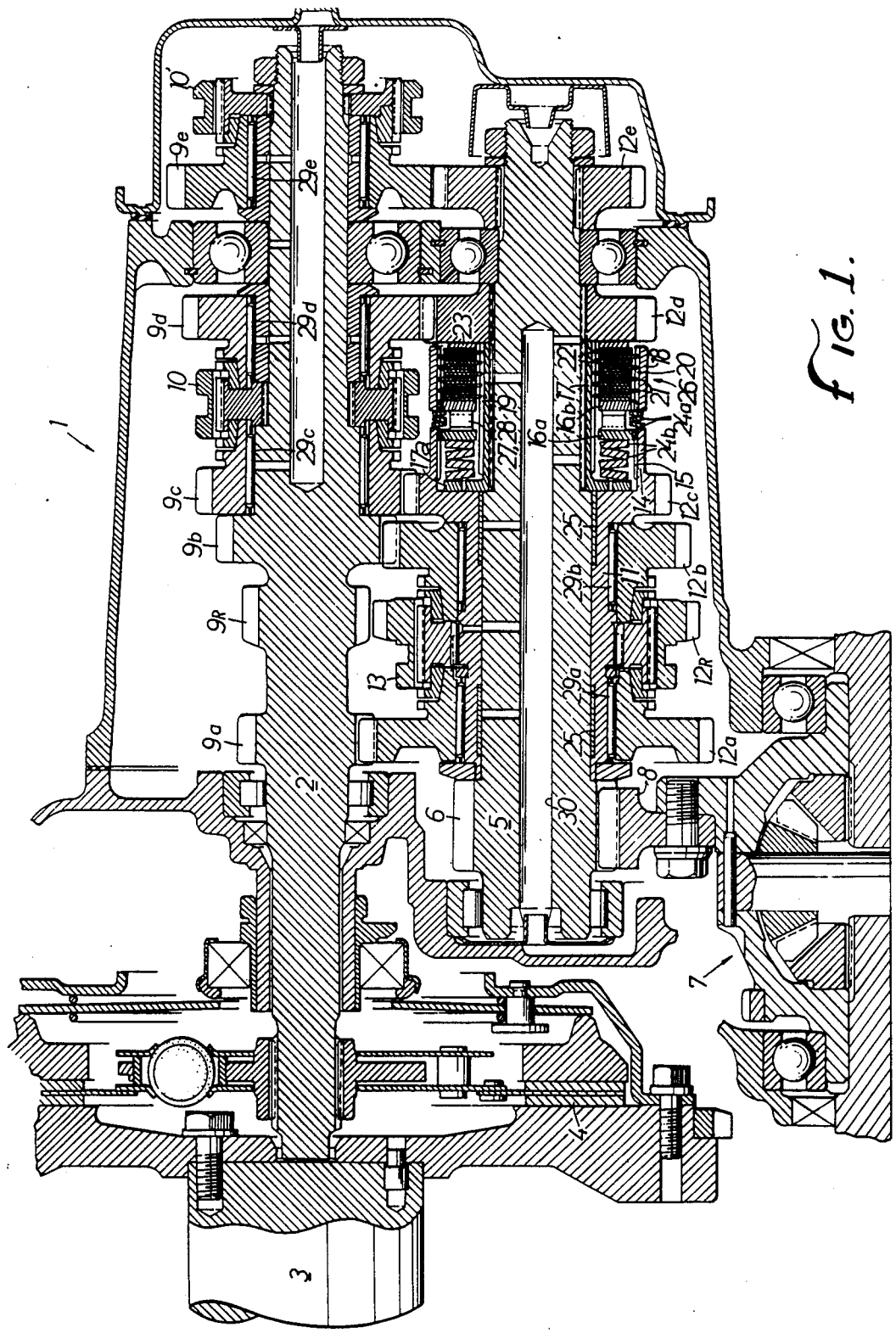
FIG. 1 is a longitudinal top plan view showing the reduction gear mechanism which is equipped with the torsional vibration absorbing system according to the preferred embodiment of the present invention.

FIG. 1 shows a reduction gear mechanism 1 of the manual shift transmission type and the related portions of a front-engine, front-drive automobile of a horizontal engine type although it will be understood that the invention may be used in other arrangements. The reduction gear mechanism 1 is attached to one end of the engine (although not shown), and its input shaft 2 is connected to the crankshaft 3 of the engine through a clutch 4. The reduction gear mechanism 1 is equipped with an output shaft 5 parallel to the input shaft 2, and a final drive gear 6 on that output shaft 5 is made to mesh with the driven gear 8 of a differential mechanism 7 which in turn drives the drive shafts to the automobile wheels.

The input shaft 2 is integrally equipped with low-speed, i.e., first- and second-speed drive gears 9a and 9b and a rear drive gear 9R, and intermediate- and high-speed, i.e., third- to fifth-speed drive gears 9c, 9d and 9e are rotatably supported through needle roller bearings 29c, 29d and 29e, respectively. These third- to fifth-speed drive gears 9c, 9d, and 9e are selectively connected to the input shaft 2 by the actions of switching clutches 10 and 10' so that they may be driven by the latter. On the output shaft 5, there is rotatably supported through a sleeve shaft 11, first- and second-speed driven gears 12a and 12b are rotatably supported through needle roller bearings 29a and 29b and on which a reverse driven gear 12R is supported through a switching clutch 13. These first-and second-driven gears 12a and 12b are made to mesh selectively with the first- and second-speed drive gears 9a and 9b of the input shaft 2, respectively, whereas a rear driven gear 12R is made to mesh with the rear drive gear 9R through an idle gear (not shown). The gears 9a, 9b and 9R are selectively connected by the switching clutch 13 to drive the sleeve shaft 11. This sleeve shaft 11 is integrally equipped with a third-speed drive gear 9c. On the output shaft 5 there are respectively splined fourth- and fifth-speed driven gears 12d and 12e which are made to mesh with the fourth- and fifth-speed drive gears 9d and 9e.

The sleeve shaft 11 is formed with a cylindrical extension 14 which axially extends adjacent to the third-speed driven gear 12c. The cylindrical extension 14 is formed in its inner face with a spline 15, with which a first cam plate 16a is made to slidably engage. On the outer circumference of the output shaft 5 between the third speed driven gear 12c and the fourth-speed driven gear 12d, moreover, there is secured an inner sleeve 17, which is surrounded by an outer sleeve 18. This outer sleeve 18 is arranged adjacent to the aforementioned extension 14. The outer circumference of the inner sleeve 17 and the inner circumference of the outer sleeve 18 are respectively formed with splines 19 and 20. Plural discs of drive and driven friction plates 21 and 22, respectively, are interposed with one another alternately and are made to slidably engage with those splines 19 and 20, respectively. Between the group of the friction plates 21 and 22 and the first cam plate 16a, there is interposed a second cam plate 16b which engages with the spline 20 of the outer sleeve 18. On the other end, a pressure receiving plate 23 is interposed between the group of the friction plates 21 and 22 and the fourth-speed drive gear 12d. Between the extension 14 and the second cam plate 16b there is sandwiched under compression a primary spring 24a for thrusting the second cam plates 16b at all times with a predetermined elastic force toward the pressure receiving plate 23. Between a bearing plate 17a, which is formed on the end portion of the inner sleeve 17 at the side of the third-speed driven gear 12c, and the first cam plate 16a, there is sandwiched a secondary spring 24b for establishing an elastic force between the two cam plates 16a and 16b. Both of these springs 24a and 24b are composed of a plurality of dish springs of the so-called Belleville washer type such that the primary spring 24a has a lower spring constant than that of the secondary spring 24b.

The inner sleeve 17, the outer sleeve 18, drive and driven friction plates 21 and 22, and the primary and secondary springs 24a and 24b comprise a friction transmission, generally designated 26, according to the present invention, through which the sleeve shaft 11 and the output shaft 5 are connected to each other. Thus, the sleeve shaft 11 leads to the engine side, i.e., the drive side corresponds to the first shaft of the present invention, whereas the output shaft 5 leads to the wheels, i.e., the driven side corresponds to the second shaft of the present invention.

Figure 2:
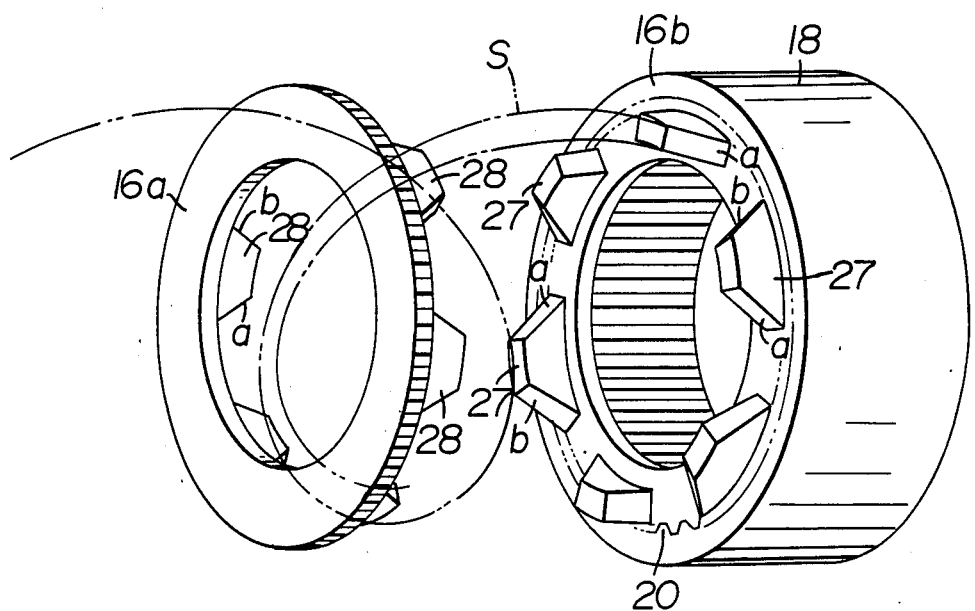
FIG. 2 is an exploded perspective view showing the first and second cam plates of the same system.

The first and second cam plates 16a and 16b are integrally formed on their opposite faces, as shown in FIG. 2, with plural angular cams 27 and 28, respectively, which are arranged to protrude in an annular form and which mesh with each other.

The respective cams 27 and 28 are formed with first slopes "a" for positive load transmission and second slopes "b" for negative load transmission, which descend in the opposite directions from the crests of the cams 27 and 28 in the circumferential directions of the respective cam plates 16a and 16b. As is apparent from FIG. 3, the angle $\alpha$ 2 (alpha) of inclination of the first slope "a" is set at a relatively small value, whereas the angle $\beta$ (beta) of inclination of the second slope "b" is set at a relatively large value. Moreover, the respective slopes "a" and "b" are formed by a portion of a helical plane S which extends around the central axis of each of the cam plates 16a and 16b. As a result, no matter what relative rotational position the two cam plates 16a and 16b might take, the facing first slopes "a" and "a" or the facing second slopes "b" and "b" maintain their face-to-face contacting states.

The output shaft 5 is formed with a central oil supply passage 30 for lubricating the sleeve shaft 11, the driven gears 12a and 12b, and so on. That oil supply passage 30 is further extended to supply the lubricating oil to the insides of the extension 14 and the outer sleeve 18, too.

Figure 3:
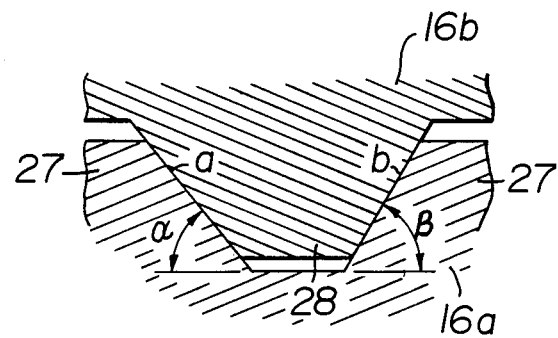
FIG. 3 is a sectional view showing the meshing states of the annular cams of the two cam plates.

The operation of the embodiment having the construction thus far described is as follows. The elastic force of the primary spring 24a continually thrusts the second cam plate 16b and the group of the friction plates 21 and 22 against the pressure receiving plate 23 so that a predetermined frictional force is applied between the drive and driven friction plates 21 and 22. On the other hand, the secondary spring 24b is in its substantially inoperative or zero force state when the cams 27 and 28 of the first and second cam plates 16a and 16b are positioned in the deepest meshing engagement, as shown in FIG. 3.

Now, if it is assumed that the first-speed driven gear 12a is connected to the sleeve shaft 11 by the operation of the switching clutch 13, the rotational torque is transmitted from the crankshaft 3 to the input shaft 2, then through the first-speed drive gear 9a, the first-speed driven gear 12a, the sleeve shaft 11, the first cam plate 16a, the cams 27 and 28, the second cam plate 16b and the outer sleeve 18 consecutively in the recited order to the drive friction plates 21. Moreover, the rotating force of the drive friction plates 21 is transmitted by the frictional force to the driven friction plates 22, through the inner sleeve 17 to the output shaft 5, and further through the final drive gear 6 to the differential mechanism 7.

Even when the second-speed driven gear 12b or the reverse driven gear 12R is connected to the sleeve tube 11 by changing the position of switching clutch 13, the torque of the input shaft 2 is transmitted by way of a similar passage to the output shaft 5 through either of those two gears. Similarly, when the third-speed drive gear 9c is connected through the switching clutch 10 to the input shaft 2, the rotational torque of the input shaft 2 is transmitted through the third-speed drive gear 9c, the third-speed driven gear 12c and the sleeve shaft 11 to the extension 14 and, as in the above-described case of the first speed, through the friction transmission 26 to the output shaft 5. When the fourth-speed drive gear 9d or the fifth-speed drive gear 9e is connected to the input shaft 2 by switching clutch 10 or 10', the torque of this shaft 2 is transmitted through the driven gear 12d or 12e directly to the output shaft 5.

If the engine is abruptly accelerated during the first, second or third-speed gears or reverse gear running operation, the input shaft 2 is attempting to increase its r.p.m. whereas the output shaft 5 is attempting to retain its r.p.m. as it is, because it is restrained by the inertia of the vehicle being driven by the wheels. As a result, a difference in the r.p.m. occurs between the sleeve shaft 11 and the output shaft 5 as slippage occurs between the drive and driven friction plates 21 and 22. Simultaneously, the first and second cam plates 16a and 16b are forced to rotate relative to each other a small amount and are displaced apart from each other by the relative slipping actions of the first slopes "a" and "a" of the cams 27 and 28 so that the first cam plate 16a compresses the secondary spring 24b into an operative state.

Thus, the fluctuations in the torque energy of the input shaft 2 are absorbed by the relative slippage between the friction plates 21 and 22 and by the relative rotations of the cam plates 16a and 16b so that the r.p.m. of the output shaft 5 is smoothly increased. The secondary spring 24b is actuated to have its elastic force increased by the separating action of the two cam plates 16a and 16b, thereby increasing the frictional force between the friction plates 21 and 22 to ensure that the torque of the input shaft 2 is transmitted to the output shaft 5 without excessive slippage. The friction plates 21 and 22 are supplied through the oil supply passage 30 with lubricating oil from the casing of the reduction gear mechanism 1 so that the frictional heat generated between the respective friction plates 21 and 22 can be dispersed.

If the engine is abruptly decelerated, on the other hand, there is established a negative load state through the transmission, in which the input shaft 2 is driven by the output shaft 5, so that a difference in the r.p.m. in the direction opposite to that of the aforementioned acceleration is established between the sleeve shaft 11 and the output shaft 5. This causes slippage between the drive friction plate 21 and the driven friction plate 22 and at the same time a small degree of relative rotation between the first and second cam plates 16a and 16b. In this case, however, since the direction of the relative rotation is opposite to that of the aforementioned acceleration, the separating force is applied between the two cam plates 16a and 16b by the relative slipping action between the second slopes "b" and "b" of the cams 27 and 28 thereby to increase the frictional force between the drive and driven friction plates 21 and 22. In this way, the negative or decelerating load of the output shaft 5 is shock-absorbed and transmitted to the input shaft 2.

Here, in the embodiment being described, the angle $\beta$ (Beta) of inclination of the second slopes "b" and "b" of the first and second cam plates 16a and 16b, which are operative during the deceleration, is set at a larger value than the angle $\alpha$ (alpha) of inclination of the first slopes "a" and "a", which are operative during the acceleration. Assuming a case in which an identical torque is applied in accelerating or decelerating directions, the separating force between the two cam plates 16a and 16b, which is generated by the relative slipping action of the second slopes "b" and "b" is weaker than the separating force between the two cam plates 16a and 16b which is generated by the relative slipping action of the first slopes "a" and "a", whereby the frictional force between the drive and driven friction plates 21 and 22, which is increased by the aforementioned separating force, has a high value during the acceleration and a low value during the deceleration. As a result, during the acceleration, the slippage between the drive and driven friction plates 21 and 22 is minimized to only that which is necessary for absorbing the torsional vibrations thereby to effect improved torque transmission at higher speeds. During the deceleration, on the other hand, the drive and driven friction plates 21 and 22 are more able to slip relative to each other thereby to efficiently absorb the torque fluctuations whereby a smooth braking effect on the engine is attained.

In either running state, i.e., acceleration or deceleration, or irrespective of the magnitude of the angle of the relative rotation of the two cam plates 16a and 16b, as has been described, the first slopes "a" and "a" or the second slopes "b" and "b", which are formed in the shape of a portion of the helical plate S, are held in their face-to-face contacting states at all times so that the unit face pressures exerted upon their contacting faces is minimized.

The torque fluctuations, i.e., the speed changing shocks between the input and output shafts 2 and 5, which are generated by switching the switching clutches 10, 10' and 13, also are absorbed in the aforementioned manner.

As has been described hereinbefore, according to the present invention, the first slopes are operative upon application of the positive load and the second slopes are operative upon application of the negative load, both being provided on the cams of the first and second cam plates which are disposed in the power train of the friction transmission, and those slopes are provided with different angles of inclination. As a result, even if the degree of the torque fluctuations changes for the acceleration and deceleration of the engine, it is possible to attain the torsional vibration absorbing characteristics which best accommodate the respective running states. Therefore, during acceleration, for example, a delay in the torque transmission, which is caused by the absorption of the torque fluctuations, can be minimized to provide excellent accelerability. During deceleration, on the other hand, the torque fluctuations can be sufficiently absorbed to exhibit a smooth braking effect on the engine so that the driver can have a comfortable deceleration feeling. Further, the slopes of the cams of the first and second cam plates are formed as a portion of a helical plane which extends around the axis of rotation of each of the cam plates whereby the cams of the two cam plates can be held in the face-to-face contacting states at all times no matter what rotational positions the two cam plates assume thereby improving force transfer and minimizing wear on the cam slopes. Moreover, since those different characteristics are obtained by the single system, the construction is simple and compact and can be easily built in the narrow area available in the reduction gear mechanism.

Although we have described our invention in connection with a single preferred embodiment, it is to be understood that the scope of our invention is not limited to that embodiment but rather is of the full scope of the appended claims.

What is claimed:

1. In a torsional vibration absorbing device for a transmission having an input shaft and an output shaft with plural pairs of interengaging gears thereon selectively coupled to the shafts for different speed ratios, the combination of, sleeve shaft means rotatably mounted on one of the shafts and having at least one of the gears thereon for rotation therewith, said sleeve shaft means having a tubular axial extension with an internal spline radially spaced from the one shaft, a sleeve encircling the one shaft axially adjacent said extension and also having an internal spline radially spaced from the one shaft, external spline means on the one shaft, a plurality of friction plates positioned in said sleeve with alternate plates having teeth for engaging the said spline in said sleeve or the said spline in the one shaft, a pair of annular cam plates with a plurality of circumferentially spaced and mating cam teeth projecting axially toward each other, one cam plate having an external spline engaging the said internal spline on said extension for allowing axial movement without relative rotation, the other cam plate mounted in said sleeve and engaging one end of said friction plates, first spring means resiliently urging said other cam plate toward said friction plates for establishing a resilient force on and friction drive through the friction plates between said sleeve and the one shaft, second spring means resiliently urging said one cam plate toward the other cam plate for increasing the resilient force on the friction plates to tend to reduce slippage, each of said cam teeth extending axially and having two cam surfaces inclined circumferentially in opposite directions at substantial angles to cause substantial axial separation movement for small relative rotational movement of the cam plates upon increases in the torque transmitted in either rotational direction for imposing additional force on the friction plates, and all of said cam surfaces inclined in one circumferential direction being at one angle and all of said cam surfaces inclined in the other circumferential direction being at a different angle for imposing said additional forces one the friction plates at two different rates depending on the direction of relative rotation of said cam plates for absorbing torsional vibration.

2. The device of claim 1 wherein said other cam plate has an external spline engaging the internal spline on said sleeve for relative axial movement.

3. The device of claim 1 wherein said first and second spring means comprise sets of Belleville washers encircling the one shaft.

4. The device of claim 1 wherein said second spring means comprises a set of Belleville washers encircling the one shaft and positioned within the said sleeve shaft means extension.

5. The device of claim 1 wherein said sleeve shaft means includes one gear formed thereon to constantly rotate therewith and at least one other gear rotatably mounted thereon with means for selectively coupling that gear to the sleeve shaft means.

6. The device of claim 1 wherein said sleeve shaft means includes at least three gears thereon selectively operable for different drives through the device and one of said gears being engaged with an idler gear for driving the one shaft in a reverse direction from the different drives by the other gears.

7. The device of claim 1 wherein the angle of inclination from the axial direction of the cam surfaces interengaged during normal forward direction torque drive through the transmission is greater than the other cam surfaces for causing a greater separation between the cam plates and imposing a greater resilient force by the second spring means on the friction plates for a same magnitude of torque transmitted in the forward drive direction than a reverse drive direction as a result of greater separation between said cam plates.

8. The device of claim 1 wherein the cam surfaces are portions of helical planes at a constant angle about the axis of the one shaft.

9. The device of claim 1 wherein the said cam teeth are of an axial length and the second spring means are of a size that continuous contact between the same cam surfaces on the same cam teeth is maintained.

10. The device of claim 1 wherein the said first spring means has a lower spring constant than the second spring means.

11. The device of claim 1 wherein the second spring means exerts only a nominal force on the one cam plate when the transmission is in a non-driving condition.

* * * * *